INFORMATION PROCESSING ARTICLE UTILIZING PHOTODECOMPOSABLE DIHYDROAROMATIC AND SIMILAR ANHYDRIDES
Original Filed Aug. 8, 1969
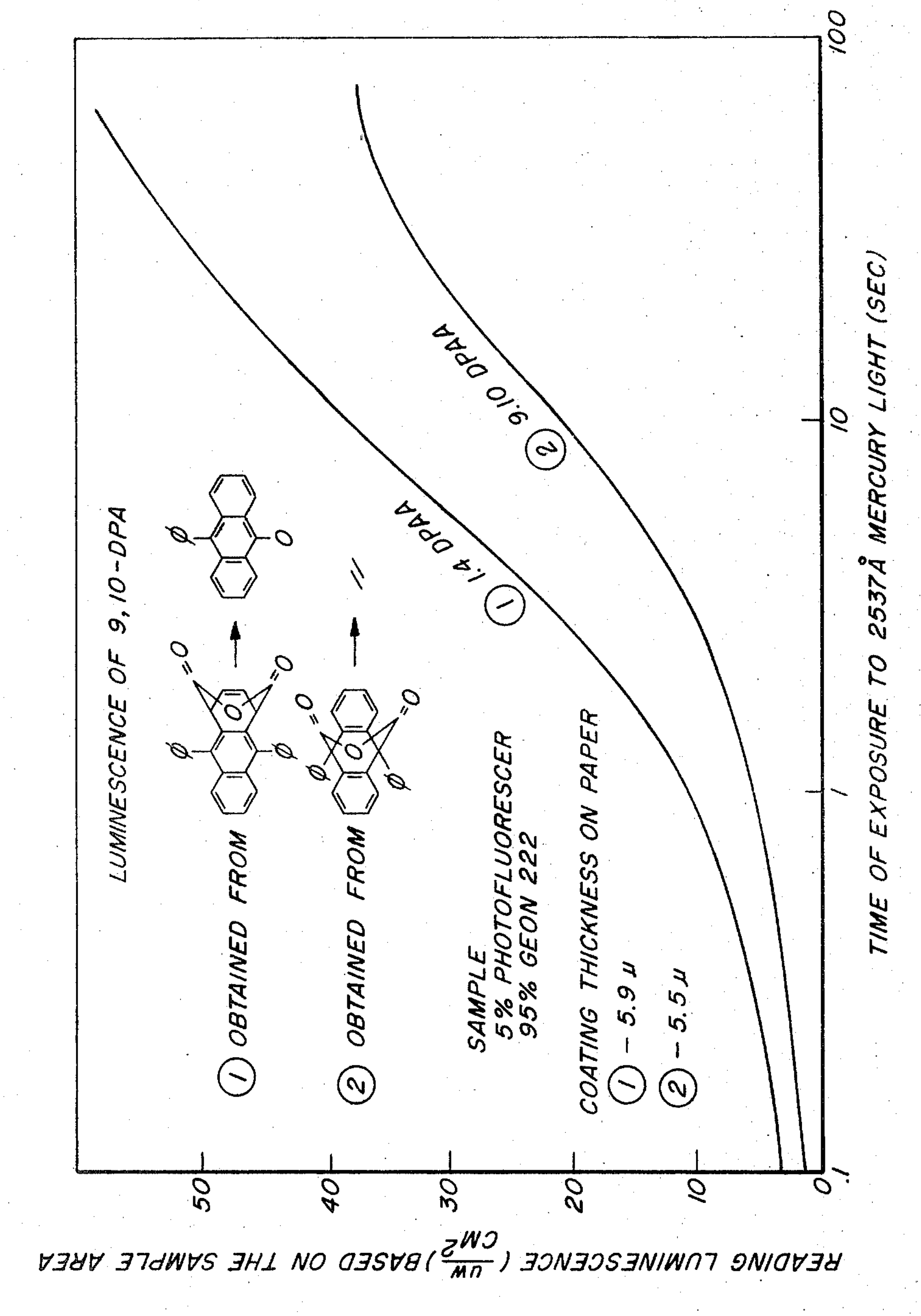

United States Patent Office 3,843,382

Patented Oct. 22, 1974

3,843,382

INFORMATION PROCESSING ARTICLE UTILIZING PHOTODECOMPOSABLE DIHYDROAROMATIC AND SIMILAR ANHYDRIDES

Arnold Zweig, Westport, Conn., assignor to American Cyanamid Company, Stamford, Conn.

Application Aug. 8, 1969, Ser. No. 848,577, which is a continuation-in-part of application Ser. No. 764,311, Oct. 1, 1968. Divided and this application Jan. 28, 1972, Ser. No. 221,841

Int. Cl. C09k *1/02*

U.S. Cl. 117—33.5 T 5 Claims

ABSTRACT OF THE DISCLOSURE

An article for storage and retrieval of information comprising a substrate incorporating a non-fluorescent material capable of conversion to a fluorescent material under light of a particular wavelength, or heat, said material being an anhydride of a polycyclic aromatic compound, which can be made to fluoresce, after such conversion, by stimulating light radiation of a longer wavelength. A fluorescent image may be formed and detected by use of the substrate.

This is a division of application Ser. No. 848,577, filed Aug. 8, 1969 now U.S. Patent No. 3,719,571, which is a continuation-in-part of Ser. No. 764,311, filed Oct. 1, 1968.

This invention relates to storage and retrieval of information by radiation and visual techniques. It more particularly relates to a system for forming a fluorescent image in a non-fluorescent material by converting the material to a fluorescent form by light irradiation or heat, and detecting the image with radiation of a different wavelength which does not convert the original compound, but which causes the fluorescent image form to emit light.

Information storage and recovery systems are of rapidly increasing importance in the present-day economy in view of the exponential rise in the number and complexity of the data which must be recorded and be retrievable to handle the increasing every-day business load, and to assist in scientific developments. Many optical systems, including those based on silver halide emulsions and the like, have contributed significantly to this development, largely because of the high packing density with good retrievable resolution inherent in such systems. Systems based on magnetic means, e.g., the well-known magnetic tape and magnetic ink check-printing systems, have likewise found great utility, largely because of the relative ease of handling and the relatively simple equipment involved, combined with, particularly in the case of the tapes, high reproducible fidelity. However, the optical systems are not as versatile as desired in that only a single image is normally recorded at any one bit, e.g., the developed Ag image. The same is true of the magnetic tape images where normally only the magnetic image is obtained at any one bit. This image can be made visual by a separate step, e.g., by dusting with iron powder. The magnetic ink images have the advantage of being both visually and magnetically sensible; however, these images suffer from a relatively low packing density.

A system for storing and retrieving information is disclosed in copending, commonly assigned application, Ser. No. 848,578, filed Aug. 8, 1969, which is a continuation-in-part of application Ser. No. 764,312, filed Oct. 1, 1968, both now abandoned, which comprises the following: a non-fluorescent material X, capable of photoconversion of a fluorescent material Y, wherein Y has an absorption band of wavelength longer than the longest wavelength band of X, is irradiated with an information-containing beam of light of such a wave length to convert the image portion of material X to the fluorescent material Y. A longer wavelength stimulating light radiation is then applied to cause compound Y to fluoresce and this display the image which can be detected visually or by suitable instrument. Thus material X may be considered as a fluorescer precursor.

For this purpose suitable compounds disclosed in the copending application, among others, are 2-(2-furyl or thienyl)-3-acylchromones of the formula:

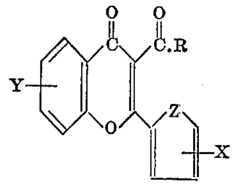

where R is phenyl, lower alkylphenyl, lower alkoxyphenyl or furyl, X is hydrogen or lower alkyl, Y is hydrogen, lower alkyl, lower alkoxy or furoyloxy and Z is oxygen or sulfur. The 2-thienyl compounds such as 2-(2-thienyl)-3-benzoylchromone, 2-(5-methyl-2-thienyl) - 3 - benzoylchromone and 2-(5-methyl-2-thienyl)-3-anisoylchromone are included since their photolysis mechanism, upon exposure to ultraviolet light is substantially the same as that of the 2-(2-furyl)-3-acylchromones.

The preparation of these chromones is described in greater detail in copending, commonly assigned application Ser. No. 859,607 filed Aug. 8, 1969, pending, which is a continuation-in-part of application Ser. No. 764,294, filed Oct. 1, 1968 now abandoned.

I have now found a new group of compounds which undergo photoconversion to a form in which they are fluorescent. These compounds are anhydrides of polycyclic aromatics which undergo a photochemical decarboxylation and decarbonylation in accordance with the following equation:

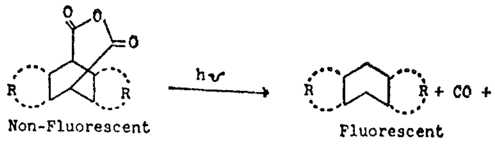

where R represents an aromatic residue, i.e., the structure which together with the nucleus will form an aromatic compound, or hydrogen atoms, wherein there are preferably three rings in the polycyclic aromatic compound.

This same reaction takes place when such compounds are raised to their melting point, since they decompose at that point.

Anhydrides which are within the scope of the invention may be represented by the formula:

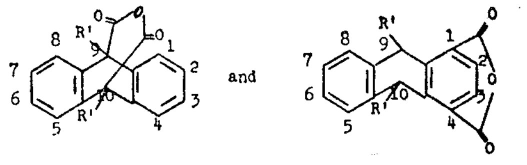

where substituents R′ may be phenyl, p-anisyl, p-cyanophenyl, phenylethynyl, p-phenylphenyl, 1-naphthyl and the like. In addition, a benzo-substituent may be present at 1–2 or 6–7; or 1–2 and 5–6; or 2–3; or 2–3 and 7–8. Methyl or methoxy substituents may be present at 1 and 2 or 1, 2, 7 and 8 or corresponding positions. Other lower alkyl or alkoxy substituents may also be used.

In particular, the 9–10, anhydride of 9,10-diphenylanthracene undergoes this reaction as follows:

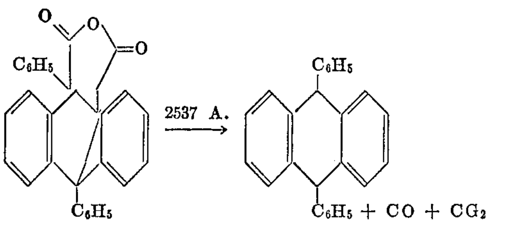

9, 10-diphenylanthracene

Under 3,000 A. light, 9,10-diphenylanthracene fluoresces. The same reduction occurs with the 1,4-anhydride of 9,10-diphenylanthracene.

As previously indicated, the same reaction occurs under heat, such as infrared radiation or direct contact heat, for example. The radiant source may be of various types providing ultra-violet or infra-radiation including lamps, electric arcs, or ultra-violet and infrared lasers. The image can be formed in any well known manner as by focusing a radiant beam, projecting a beam through a stencil, by use of moving mirror systems with lasers and the like. Detectable fluorescence is obtained by exposure for less than a second, and even as low as nanoseconds to milliseconds.

It will be understood that information formed may be of any desired type, that is, alphanumeric characters, code markings such as dots or lines, or pictorial information.

In the present invention, storage of information is rapid, accurate and dry, no fixing being required. Retrieval is rapid, exceptionally sensitive and accurate and is not accompanied by degradation. The inventive technique combines photochemical deposition of information, allowing fine resolutions, with detection by fluorescence (more sensitive than absorption). As mentioned, no fixing is required where the fluorescer precursor is only sensitive to light of wavelength of less than 290 mμ.

The inventive method may be used to replace any process that employs change of optical density to change an electrical signal. This may include electronic storage and replay of sound and pictures, numerical data collection and retrieval, and the like; and to produce and validate cards, stamps, passes, mail and the like documents.

The fluorescer precursor X may be a colorless material, as may also the converted material Y. In this instance, the storage and retrieval may be unknown to all persons except those intended to have knowledge of the information storage. This could be used for placing information on passes or documents to be retained by one person and checked or authenticated by another such as in the case of a gate pass. An advantage of the present system is that any portion or entire cards or documents can be treated with fluorescer precursor material X, even over other information or images, after which particular information may be put on the treated part by light projection, infrared radiation, or hot die stamping. It will be apparent therefore, that many cards may be produced, with individual information placed thereon at a later time, by conversion of the desired image portion to a fluorescent compound Y. Since the compounds are colorless in either state, space is saved in that the later information is printed over the original visible information. Detection is preferably, as previously indicated, by means of a longer wavelength light which stimulates the fluorescent form of the material. This stimulating radiation is of such a wavelength that it does not convert any of the remaining material X to material Y. Although this is the preferable mode of operation in order to prevent conversion of the background to the same state as the image by the detecting radiation, where the detection is relatively of short duration, this could be done by the same wavelength radiation as used to form the image.

The present material has a further characteristic that the amount of detectable fluorescence is proportional to the amount of latent fluorescer which has been converted to the fluorescent state. The amount converted on any radiated area depends on the duration of time of exposure to the irradiating energy. The longer the time period is, the more latent fluorescer there will be converted per unit of exposed area and thus the more intense the fluorescence upon subsequent radiation and detection. This characteristic makes it possible to produce detectable variable tone fluorescent radiation over a given area. This is much like the tone variation in a photographic negative or a magnetic sound tape. Thus the present invention could be used to prepare a sound tape by audio modulation of the radiant source. The sound is detectable by conventional fluorescent detection means coupled to audio output means by a suitable transducer. A sound track could be put on a movie film in the same manner, either beside the picture, or printed directly on the film. A phonograph disc could be prepared and played by the same principle.

While the converted fluorescent information cannot be optically reconverted to the anhydride non-fluorescent state which would give an erase capability, it would be possible to insert new information by blotting an old word or number by converting it entirely to a fluorescent "bar," and creating another word or number adjacent thereto in fluorescer precursor material X. This, of course, is limited to the area of the object which has been treated with fluorescer precursor material X. Another alternative would be to convert the diphenyl anthracene fluorescer to the endoperoxide as described in copending, commonly assigned application Ser. No. 848,686, filed Aug. 8, 1969, now U.S. Pat. No. 3,683,336, which is non-fluorescent, by radiation with visible light in the presence of oxygen. This endoperoxide could then be optically converted to a fluorescent form as described in the copending application.

The fluorescer precursor material X may be coated on any desired substrate such as paper, glass, wood, plastic, cloth, leather, and the like, or it may be incorporated in transparent or opaque plastic films. The substrate may be of any configuration, i.e. sheets, belts, discs, drums, three dimensional objects, such as bottles, boxes, and the like. Techniques for this will be readily apparent to persons skilled in the art. It will be obvious that choice of materials may depend on the particular intended use.

The fluorescer precursor material X may be any anhydride as described above which has the desired properties, that is it has a non-fluorescent form which absorbs light, or heat, to be converted to a form in which it fluoresces under light of a longer wavelength than that used for conversion to the fluorescent form.

The invention will be further described and illustrated by the following specific examples which are representative of the wide variety of photosensitive chromones provided thereby.

Example I

In this Example, 9,10-diphenyl-9,10-dihydroanthracene-9,10-anhydride, which does not fluoresce, was photochemically converted to 9,10-diphenylanthracene, a blue fluorescent compound.

A sample of 9,10-diphenyl-9,10-dihydroanthracene-9,10-anhydride, prepared as described by M. M. Rauhut, D. Sheehan, R. A. Clark and A. M. Semsel, Photochemistry and Photobiology (1965) Vol. 4, pp. 1,097–1,110 having a melting point 223–225° C. (decomposition), was dissolved in methylene chloride. No fluorescence was evident when irradiated with long ultraviolet light of 300 mμ or greater. The solution was flushed with nitrogen and irradiated with ultraviolet light from a B-H6 lamp (principally less than 300 mμ). After a few minutes, a strong blue fluorescence was detectable under long wave ultraviolet light without further conversion of anhydride.

Comparison of the fluorescent material with the spectrum of an authentic sample confirmed that the fluorescent product was 9,10-diphenylanthracene.

Example II

A sample of the anhydride of Example I was recrystallized from methylene chloride-petroleum ether to give a mixture of hard prisms and soft fluffy solid. The prisms were separted and had a melting point of 243–248° C. They appeared to be a purer form of the anhydride.

A $1.1 \times 10^{-4}\underline{M}$ solution in methylene chloride was irradiated with short wave ultraviolet light from a B–H6 lamp as in Example I. Strong blue fluorescence could be detected after a few seconds by long wave ultraviolet irradiation as in Example I without further conversion of the anhydride.

Example III

In the same maner as in Examples I and II, fluorescence was obtained by photoconversion of the anthracene-9,10-anhydride to anthracene.

Example IV

Fluorescence was also obtained from the anhydrides of Examples I–III, by the application of heat to decompose the anhydride. The anhydrides decompose at the melting point to the corresponding anthracene compound. Heat was supplied in either the form of infrared radiation or a hot stamp directly applied to the anhydride.

Example V

*Preparation of 9,10-Diphenyl-1,4-dihydroanthracene-1,4-anhydride*

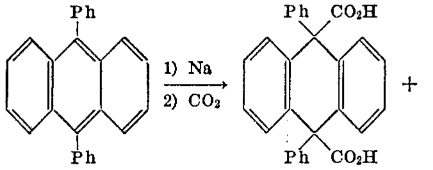

1 2

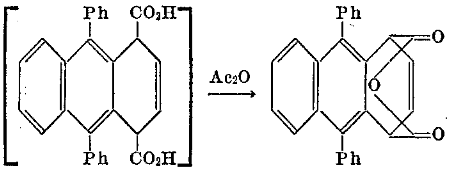

3 4

The methylene chloride solution obtained from the trituration of 2 was evaporated to a gum containing 3 which was dissolved in the minimum amount of acetic anhydride. The solution was refluxed for 20 minutes and distilled to dryness *in vacuo*. The dark red residue was crystallized from methylene chloride-petroleum ether to give a 2.5% yield (based on 1) of 4, m.p. 247–265° C. dec. Recrystallization from the same solvent mixture afforded nearly colorless crystals, m.p. 263–271° C. dec.

*Analysis*.—Calcd. for $C_{20}H_{18}O_3$: C, 83.56; H, 4.51. Found: C, 83.58; H, 4.77.

Ultraviolet spectrum $\lambda_{max}^{CH_2Cl_2}$ 241 mμ (ε, 68,000) 290 (19,200), 300 (13,600), and 337 (3200)

Example VI

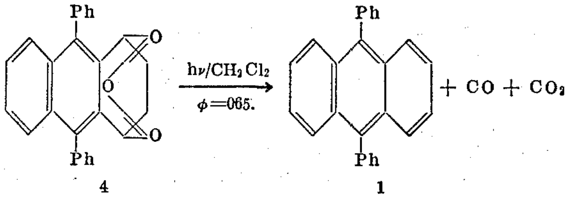

4 1

A methylene chloride solution of the compound of Example V was irradiated by a shortwave ultraviolet light source as in Example I. Strong blue fluorescence could be detected after a few seconds by irradiation with long wave ultraviolet light as in Example I without further conversion of the anhydride.

Examples VII and VIII

Two solutions were prepared as follows:

Solution 1

| | Percent |
|---|---|
| Anhydride of Example V | 5 |
| Geon 222 | 95 |

Solution 2

| | Percent |
|---|---|
| Anhydride of Example I | 5 |
| Geon 222 | 95 |

(Geon 222, a coplymer of polyvinyl chloride and polyvinylidene chloride from Goodrich Rubber Company.)

Solution 1 was coated on low fluorescence white paper stock at a thickness of 5.9μ.

Solution 2 was coated on the same type paper at approximately the same thickness, 5.5μ.

The coated papers were exposed to varying intensity irradiation from a mercury light (H–100 mercury light, 2537 A.). The reading luminescence versus exposure time is shown in the figure.

Detectable fluorescence was obtained in milliseconds of exposure.

While certain specific examples and preferred modes of operation have been set forth, it will be obvious that this is solely for illustration, and that various changes and modifications may be made in the invention without departing from the spirit of the disclosure and the scope of the appended claims.

What is claimed is:

1. A substrate incorporating an aromatic anhydride compound of the formula:

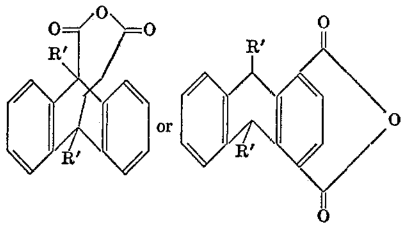

where substituents R′ may be phenyl, p-anisyl, p-cyanophenyl, phenylethynyl, p-phenylphenyl, 1-naphthyl; a benzo-substituent may be present at 1–2, 2–3, 5–6, 6–7 or 7–8; and methyl or methoxy substituents may be present at 1, 2, 7 or 8 positions.

2. The substrate of claim 1 wherein said compound is 9,10-diphenyl-9,10-dihydroanthracene-9,10-anhydride.

3. The substrate of claim 1 wherein said compound is 9,10-diphenyl-1,4-dihydroanthracene-1,4-anhydride.

4. The substrate of claim 1, said substrate being paper.

5. The substrate of claim 1, said substrate being plastic.

References Cited

UNITED STATES PATENTS

| | | | |
|---|---|---|---|
| 2,231,788 | 2/1941 | Adams et al. | 260—333 |
| 3,048,697 | 8/1962 | Cavanaugh et al. | 250—71 |
| 3,279,826 | 10/1966 | Rudershaven et al. | 250—71 |
| 3,282,697 | 11/1966 | Blank et al. | 250—65 |
| 3,418,470 | 12/1968 | Birkeland | 250—71 |
| 3,467,825 | 9/1969 | Hubert | 250—71 |
| 3,508,208 | 4/1970 | Diguey et al. | 250—71 |

OTHER REFERENCES

Beckett et al.: Journal of Chemical Society (London), pp. 3328 and 3329 (1953).

Beckett et al.; Journal of Chemical Society (London), pp. 588–595 (1961).

MICHAEL SOFOCLEOUS, Primary Examiner

U.S. Cl. X.R.

96—45.1; 117—1.7, 123 C, 138.8 B, 147, 154; 250—461, 484; 252—301.2